US012663037B2

(12) United States Patent
Lyon et al.

(10) Patent No.: US 12,663,037 B2
(45) Date of Patent: Jun. 23, 2026

(54) FIXTURE FOR COMPONENTS

(71) Applicant: ROLLS-ROYCE plc, London (GB)

(72) Inventors: Stephen Lyon, Derby (GB); Glynn C Van Heeswijk, Derby (GB); James Parker, Derby (GB)

(73) Assignee: Rolls-Royce plc, London (GB)

( * ) Notice: Subject to any disclaimer, the term of this patent is extended or adjusted under 35 U.S.C. 154(b) by 237 days.

(21) Appl. No.: 18/678,449

(22) Filed: May 30, 2024

(65) Prior Publication Data

US 2024/0418198 A1 Dec. 19, 2024

(30) Foreign Application Priority Data

Jun. 19, 2023 (GB) ...................................... 2309162

(51) Int. Cl.
*F16B 21/16* (2006.01)
*G01M 15/14* (2006.01)

(52) U.S. Cl.
CPC ........... *F16B 21/165* (2013.01); *G01M 15/14* (2013.01)

(58) Field of Classification Search
CPC ...... F01D 25/28; F01D 25/285; F01D 25/003; F01D 5/3007; F01D 5/32; F01D 5/323; F16B 21/16; F16B 21/165; F16B 7/1408; F16B 7/1427; F16B 7/1436; F16B 7/149; F16B 2/02; F16B 2/04; F16B 2/16; G01M 15/14
See application file for complete search history.

(56) References Cited

U.S. PATENT DOCUMENTS

| | | | | |
|---|---|---|---|---|
| 3,233,496 A | * | 2/1966 | Frick ..................... | F16B 21/165 |
| | | | | 411/348 |
| 3,720,481 A | * | 3/1973 | Motta ........................ | F01D 5/28 |
| | | | | 416/207 |
| 4,022,545 A | * | 5/1977 | Shank ................... | F01D 5/3007 |
| | | | | 416/135 |

(Continued)

FOREIGN PATENT DOCUMENTS

| | | |
|---|---|---|
| CN | 206622473 U | 11/2017 |
| CN | 209673370 U | 11/2019 |

(Continued)

OTHER PUBLICATIONS

Great Britain search report dated Dec. 11, 2023, issued in GB Patent Application No. 2309162.2.

(Continued)

*Primary Examiner* — Jonathan P Masinick

(57) ABSTRACT

A fixture for removably securing a plurality of components includes a hollow body including a plurality of channels and a plurality of sets of holes. The fixture further includes a plurality of hollow wedges and a plurality of sets of balls. Upon an axial movement of an elongate member in a first direction, the elongate member axially moves a first hollow wedge, thereby causing one or more elastic members to be sequentially compressed and move the subsequent hollow wedges. Upon the axial movement, a frustoconical surface portion of each hollow wedge moves the corresponding set of balls radially outwards within the corresponding set of holes, such that each ball extends partially into the corresponding channel, thereby moving the corresponding component into locking engagement with the corresponding channel.

20 Claims, 12 Drawing Sheets

(56) References Cited

U.S. PATENT DOCUMENTS

| | | | | |
|---|---|---|---|---|
| 4,720,114 A * | 1/1988 | Braitmaier | F16B 2/16 269/48.1 |
| 5,544,873 A * | 8/1996 | Vickers | B23B 1/00 29/889.22 |
| 5,877,566 A * | 3/1999 | Chen | F01D 5/148 310/58 |
| 6,652,369 B2 * | 11/2003 | Jones | B24B 19/14 451/406 |
| 6,820,468 B2 * | 11/2004 | Powers | F01D 25/285 73/49.7 |
| 7,618,234 B2 * | 11/2009 | Brackett | F01D 25/246 29/889.22 |
| 7,658,004 B2 * | 2/2010 | Mielke | F01D 5/12 29/889.7 |
| 7,762,739 B2 * | 7/2010 | Blanchard | A01B 59/002 403/322.2 |
| 8,206,086 B1 * | 6/2012 | Johnson | F04D 29/541 415/137 |
| 8,505,388 B2 * | 8/2013 | Mason | G01M 5/005 73/826 |
| 8,517,688 B2 * | 8/2013 | Joshi | F01D 5/3038 416/500 |
| 8,650,961 B2 | 2/2014 | Hanoomanjee et al. | |
| 8,966,961 B2 | 3/2015 | Baum et al. | |
| 9,789,513 B2 | 10/2017 | Feuerstein et al. | |
| 10,018,065 B2 * | 7/2018 | Vogel | F01D 5/3007 |
| 10,087,948 B2 * | 10/2018 | Drozdenko | F04D 29/34 |
| 10,260,512 B2 * | 4/2019 | Hall | F01D 5/34 |
| 10,822,839 B2 * | 11/2020 | Stachowiak, Jr. | F16B 21/165 |
| 10,871,076 B2 * | 12/2020 | Jang | F01D 5/32 |
| 10,871,402 B2 * | 12/2020 | Giordan | G01K 1/026 |
| 11,002,638 B2 * | 5/2021 | Ouyang | G01M 15/14 |
| 11,028,709 B2 * | 6/2021 | Subramanian | F01D 25/28 |
| 11,060,949 B2 | 7/2021 | Huot et al. | |
| 11,241,749 B2 * | 2/2022 | Hashimoto | F01D 5/14 |
| 11,578,620 B2 * | 2/2023 | Ren | G01N 21/9515 |
| 11,624,297 B2 * | 4/2023 | Lee | F01D 25/24 60/770 |
| 11,815,425 B2 * | 11/2023 | Shiomi | G01M 15/14 |
| 2017/0198592 A1 * | 7/2017 | Colletti | F01D 5/3007 |
| 2018/0080845 A1 * | 3/2018 | Dominique | G01M 7/027 |
| 2018/0306222 A1 * | 10/2018 | Preston | F03D 80/00 |
| 2023/0220856 A1 * | 7/2023 | Vrhovec | B25B 5/065 269/22 |
| 2023/0240793 A1 * | 8/2023 | Soto | A61B 34/30 211/85.13 |

FOREIGN PATENT DOCUMENTS

| CN | 110530590 B | 6/2020 |
|---|---|---|
| FR | 3124261 A1 | 12/2022 |
| KR | 101293380 B1 | 8/2013 |

OTHER PUBLICATIONS

European search report dated Oct. 25, 2024, issued in EP Patent Application No. 24176872.0.

* cited by examiner

110

130,130(1)
120,120b
121
150,150(1)
152,152b
132,132b
144
126
152,152a
132,132a
130,130(1)
120,120a
121
128
150,150(1)
140,140(1)
142
132,132d
130,130(1)
120,120d
121
150,150(1)
152,152d
166
132,132c
130,130(1)
150,150(1)
120,120c
152,152c
Z-Z'

R
A
C

FIXTURE FOR COMPONENTS

CROSS-REFERENCE TO RELATED APPLICATIONS

This specification is based upon and claims the benefit of priority from United Kingdom patent application number GB 2309162.2 filed on Jun. 19, 2023, the entire contents of which is incorporated herein by reference.

BACKGROUND

Technical Field

The present disclosure generally relates to a fixture for components.

Description of the Related Art

A wide variety of inspection techniques (e.g., dimensional measurement, surface condition monitoring, etc.) are used to gather data and to provide assessment reports for critical components, such as components of a gas turbine engine. Some components may also need to bisected at various angles to provide a line of sight to inaccessible features. It may be desirable to inspect multiple components together in the form of batch processing. Inspection of multiple components may be an expensive and time-consuming operation due to significant complexities involved in fixturing multiple components together on inspection machines or devices.

SUMMARY

According to a first aspect, there is provided a fixture for removably securing a plurality of components. The fixture includes a hollow body defining a central axis. The hollow body includes a first axial end and a second axial end axially spaced apart from the first axial end with respect to the central axis. The hollow body further includes an inner surface defining an interior volume of the hollow body. The hollow body further includes an outer surface disposed radially outwards from the inner surface with respect to the central axis. The hollow body further includes a plurality of channels axially extending from the first axial end at least partially towards the second axial end along the central axis and angularly spaced apart from each other with respect to the central axis. The plurality of channels are disposed on the outer surface and radially extend partially towards the inner surface. Each channel from the plurality of channels is configured to at least partially and slidably receive therein from the first axial end at least two of the plurality of components disposed adjacent to each other with respect to the central axis. The hollow body further includes a plurality of sets of holes axially spaced apart from each other with respect to the central axis. Each set of holes from the plurality of sets of holes includes a plurality of holes corresponding to the plurality of channels and angularly spaced apart from each other with respect to the central axis. Each hole of each set of holes extends from the inner surface partially towards the outer surface and communicates with the corresponding channel from the plurality of channels. The fixture further includes a plurality of hollow wedges corresponding to the plurality of sets of holes and axially spaced apart from each other with respect to the central axis. Each hollow wedge from the plurality of hollow wedges is movably disposed within the interior volume of the hollow body. Each hollow wedge includes an outer wedge surface facing the inner surface of the hollow body and an inner wedge surface opposing the outer wedge surface. The outer wedge surface includes a frustoconical surface portion extending circumferentially around the central axis. The plurality of hollow wedges include a first hollow wedge disposed proximal to the first axial end and a second hollow wedge disposed proximal to the second axial end. The fixture further includes a plurality of sets of balls corresponding to the plurality of sets of holes and axially spaced apart from each other with respect to the central axis. Each set of balls from the plurality of sets of balls includes a plurality of balls corresponding to the plurality of holes of the corresponding set of holes and angularly spaced apart from each other with respect to the central axis. Each ball of each set of balls is at least partially and movably received within the corresponding hole of the corresponding set of holes and engages with the outer wedge surface of the corresponding hollow wedge. Each ball of each set of balls is configured to engage with a corresponding component from the plurality of components. The fixture further includes an elongate member at least partially received within the interior volume of the hollow body and extending along the central axis. The elongate member is axially movable along the central axis. The elongate member is at least partially received within each hollow wedge and is disposed adjacent to the inner wedge surface of each hollow wedge. The elongate member is axially engaged with the first hollow wedge. The fixture further includes one or more elastic members disposed within the interior volume of the hollow body and around the elongate member. Each elastic member from the one or more elastic members axially extends between and engages with a corresponding pair of axially adjacent hollow wedges from the plurality of hollow wedges. Upon an axial movement of the elongate member in a first direction from the first axial end to the second axial end, the elongate member axially moves the first hollow wedge in the first direction, thereby causing the one or more elastic members to be sequentially compressed along the first direction and sequentially move the hollow wedges subsequent to the first hollow wedge in the first direction. Upon the axial movement of each hollow wedge in the first direction, the frustoconical surface portion of each hollow wedge moves the corresponding set of balls radially outwards with respect to the central axis within the corresponding set of holes, such that each ball of the corresponding set of balls extends at least partially into the corresponding channel, thereby engaging and moving the corresponding component into locking engagement with the corresponding channel.

The plurality of channels of the hollow body may at least partially and slidably receive therein the corresponding at least two of the plurality of components disposed adjacent to each other with respect to the central axis. Upon the axial movement of the elongate member in the first direction, the plurality of hollow wedges may move in the first direction, thereby causing the frustoconical surface portion of each hollow wedge to move the corresponding set of balls radially outwards within the corresponding set of holes. This may cause each ball of the corresponding set of balls to extend at least partially into the corresponding channel, thereby engaging and moving the corresponding component into locking engagement with the corresponding channel. Thus, the fixture of the present disclosure may allow the plurality of components to be clamped simultaneously based on the axial movement of the elongate member (i.e., a single fastener) in the first direction. The fixture may provide a simple and effective solution for clamping multiple components together, thereby improving an efficiency of the fixturing the plurality of components and reducing a cost of processing the plurality of components.

In some embodiments, the elongate member is threadingly engaged with the hollow body and configured to move axially relative to the hollow body upon rotation about the central axis. The elongate member may be supported within the interior volume of the hollow body along the central axis since the elongate member is threadingly engaged with the hollow body. Further, the elongate member may be able to axially move within the interior volume of the hollow body upon rotation about the central axis due to the threading engagement.

In some embodiments, the elongate member includes a head disposed proximal to the first axial end of the hollow body and axially engaging with the first hollow wedge, and a shaft extending from the head and disposed adjacent to the inner wedge surface of each hollow wedge. The shaft includes an externally threaded portion disposed proximal to the second axial end of the hollow body and threadingly engaged with the hollow body. The shaft receives the plurality of hollow wedges thereon between the head and the externally threaded portion. The head may enable the elongate member to axially move the first hollow wedge in the first direction upon the axial movement of the elongate member in the first direction. The shaft may support the plurality of hollow wedges thereon within the interior volume of the hollow body.

In some embodiments, the second hollow wedge further includes an engaging feature disposed at the inner wedge surface. The shaft of the elongate member further includes a complementary engaging feature configured to engage with the engaging feature of the second hollow wedge. The complementary engaging feature of the shaft of the elongate member may allow the second hollow wedge to move along with the shaft of the elongate member along the central axis based on the engagement of the complementary engaging feature with the engaging feature of the second hollow wedge.

In some embodiments, the engaging feature of the second hollow wedge is an annular recess. The complementary engaging feature of the shaft is an annular projection. The annular recess of the second hollow wedge may receive the annular projection of the shaft, thereby allowing the second hollow wedge to move axially with the shaft based on the engagement of the annular recess with the annular projection.

In some embodiments, upon the axial movement of the elongate member in a second direction opposite to the first direction, the one or more elastic members uncompress and move each hollow wedge apart from the second hollow wedge in the second direction. Upon the axial movement of the elongate member in a second direction opposite to the first direction, the complementary engaging feature of the shaft engages with the engaging feature of the second hollow wedge and moves the second hollow wedge in the second direction. Upon the axial movement of each hollow wedge in the second direction, the frustoconical surface portion of each hollow wedge moves the corresponding set of balls radially inwards with respect to the central axis within the corresponding set of holes and releasably disengages the corresponding components from the corresponding channel. Thus, the axial movement of the elongate member in the second direction may allow the frustoconical surface portion of each hollow wedge to move the corresponding set of balls radially inwards with respect to the central axis, thereby unlocking the corresponding components from the corresponding channel.

In some embodiments, the shaft is rotatable about the central axis relative to the plurality of hollow wedges. The shaft is axially movable along the central axis in the first direction relative to the plurality of hollow wedges. The shaft is axially movable along the central axis in the second direction relative to the plurality of hollow wedges apart from the second hollow wedge. Thus, the shaft may allow unrestricted axial movement of the plurality of hollow wedges along the central axis in the first direction. Further, the shaft may axially move the second hollow wedge along the central axis in the second direction upon the axial movement of the shaft in the second direction.

In some embodiments, the head of the elongate member includes a head end surface disposed around the shaft. The first hollow wedge includes an axial end surface axially engaging with the head end surface of the head. The head end surface of the head may allow the elongate member to axially move the first hollow wedge in the first direction upon the axial movement of the elongate member in the first direction.

In some embodiments, the frustoconical surface portion of each hollow wedge tapers inwardly towards the central axis in the first direction. Thus, the frustoconical surface portion of each hollow wedge may allow the corresponding set of balls to move radially outwards with respect to the central axis within the corresponding set of holes based on the axial movement of each hollow wedge in the first direction.

In some embodiments, the outer wedge surface of each hollow wedge further includes a uniform surface portion extending from the frustoconical surface portion towards the second axial end of the hollow body. The uniform surface portion includes a uniform outer width about the central axis. The frustoconical surface portion tapers outwardly from the uniform surface portion towards the first axial end of the hollow body. The uniform surface portion of each hollow wedge may allow the corresponding set of balls to move radially inwards with respect to the central axis within the corresponding set of holes based on the axial movement of each hollow wedge in the second direction.

In some embodiments, in an unlocked configuration of the fixture, the uniform surface portion of each hollow wedge engages each ball of the corresponding set of balls, such that each ball of the corresponding set of balls is radially spaced apart from the corresponding channel and disengaged from the corresponding component. In a locked configuration of the fixture, the frustoconical surface portion of each hollow wedge engages each ball of the corresponding set of balls, such that each ball of the corresponding set of balls extends at least partially into the corresponding channel and engages the corresponding component. In the unlocked configuration of the fixture, since each ball of the corresponding set of balls is radially spaced apart from the corresponding channel and disengaged from the corresponding component, the corresponding component may be inserted or removed from the corresponding channel. In the locked configuration of the fixture, each ball of the corresponding set of balls extends at least partially into the corresponding channel and engages the corresponding component, thereby moving the corresponding component into locking engagement with the corresponding channel.

In some embodiments, each elastic member is a coil spring. Thus, the one or more elastic members may be able to compress upon the axial movement of the first hollow wedge in the first direction, and sequentially move the hollow wedges subsequent to the first hollow wedge in the first direction.

In some embodiments, the plurality of channels include at least three channels equiangularly spaced around the central axis. Each set of holes includes at least three holes equiangularly spaced around the central axis. Each set of balls includes at least three balls. Thus, the fixture may allow multiple components to be clamped simultaneously.

In some embodiments, each channel includes a groove feature complementary to a tongue feature of each of the plurality of components. The groove feature is configured to lockingly engage with the tongue features of the corresponding at least two of the plurality of components. The groove feature may allow each of the plurality of components to be at least partially and slidably received within the corresponding channel. The groove feature may lockingly engage with the tongue features of the corresponding at least two of the plurality of components upon the radially outward movement of the corresponding set of balls with respect to the central axis within the corresponding set of holes.

In some embodiments, the groove feature includes a dovetail geometry. The dovetail geometry may allow the corresponding at least two of the plurality of components to be lockingly engaged with the corresponding channel.

In some embodiments, the hollow body further includes an annular securing portion disposed at the second axial end and configured to be removably secured to a holder. The annular securing portion may allow the hollow body to be reliably secured to the holder.

In some embodiments, each channel extends between an open end disposed at the first axial end of the hollow body to a closed end disposed proximal to the second axial end of the hollow body. The closed end of each channel is configured to engage with the corresponding adjacent component, thereby acting as an axial stop for the corresponding adjacent component. The open end of each channel may allow the corresponding at least two of the plurality of components to be slidably received within the corresponding channel. The closed end of each channel may restrict further movement of the corresponding at least two of the plurality of components within the corresponding channel and may function as a positioning feature for the corresponding adjacent component.

According to a second aspect, there is provided an inspection system. The inspection system includes a plurality of components, a holder, and the fixture of the first aspect. Each channel from the plurality of channels is configured to at least partially and slidably receive therein from the first axial end at least two of the plurality of components disposed adjacent to each other with respect to the central axis. The hollow body is removably secured to the holder at the second axial end. The inspection system may allow the plurality of components to be assessed together since each channel of the fixture is configured to clamp at least two of the plurality of components.

In some embodiments, each of the plurality of components is a prototype of a part of a gas turbine engine. Thus, the inspection system may be able to assess critical components such as the parts of the gas turbine engine.

According to a third aspect, there is provided a method for removably securing a plurality of components to the fixture of the first aspect. The method includes slidably inserting the plurality of components into the plurality of channels from the first axial end of the hollow body, such that each channel receives at least two of the plurality of components disposed adjacent to each other with respect to the central axis. The method further includes axially moving the elongate member in the first direction to lockingly engage each of the plurality of components with the corresponding channel. The proposed method may allow the plurality of components to be clamped simultaneously based on the axial movement of the elongate member in the first direction.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
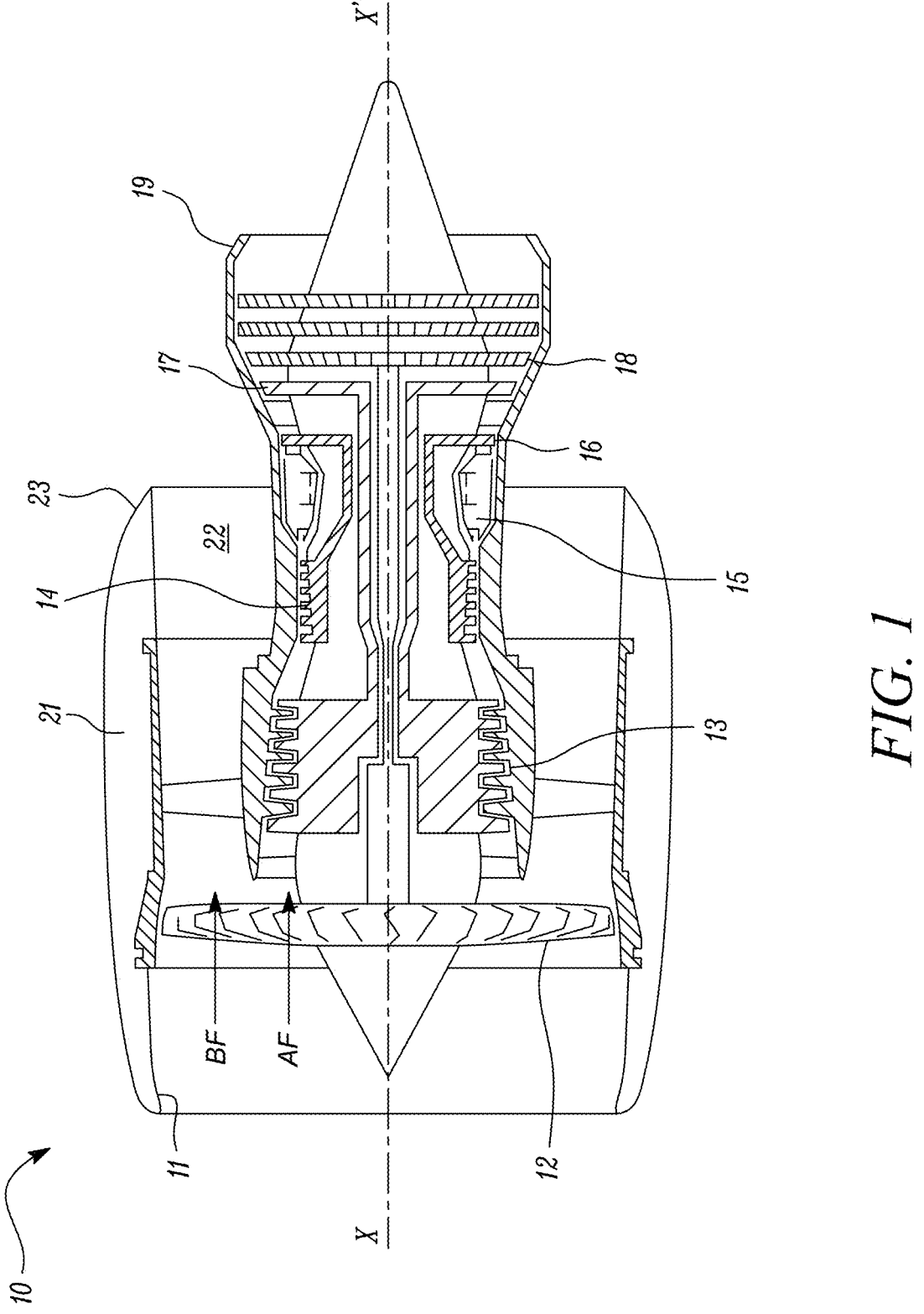
FIG. 1 is a schematic sectional side view of a gas turbine engine.

FIG. 1 shows a schematic sectional side view of a gas turbine engine 10 having a principal rotational axis X-X'. The gas turbine engine 10 includes, in axial flow series, an air intake 11, a compressive fan 12 (which may also be referred to as a low pressure compressor), an intermediate pressure compressor 13, a high pressure compressor 14, combustion equipment 15, a high pressure turbine 16, an intermediate pressure turbine 17, a low pressure turbine 18, and a core exhaust nozzle 19. A nacelle 21 generally surrounds the gas turbine engine 10 and defines the air intake 11, a bypass duct 22, and a bypass exhaust nozzle 23.

The gas turbine engine 10 works in a conventional manner so that the air entering the air intake 11 is accelerated by the compressive fan 12 to produce two air flows: a first air flow AF into the intermediate pressure compressor 13, and a second air flow BF which passes through the bypass duct 22 to provide a propulsive thrust. The intermediate pressure compressor 13 compresses the first air flow AF directed into it before delivering that air to the high pressure compressor 14 where further compression takes place.

The compressed air exhausted from the high pressure compressor 14 is directed into the combustion equipment 15 where it is mixed with fuel and the mixture is combusted. The resulting hot combustion products then expand through, and thereby drive the high, intermediate, and low pressure turbines 16, 17, 18 before being exhausted through the core exhaust nozzle 19 to provide additional propulsive thrust. The high, intermediate, and low pressure turbines 16, 17, 18 respectively drive the high and intermediate pressure compressors 14, 13, and the compressive fan 12 by suitable interconnecting shafts.

In some embodiments, the gas turbine engine 10 is used in an aircraft. In some embodiments, the gas turbine engine 10 is an ultra-high bypass ratio engine (UHBPR). In addition, the present disclosure is equally applicable to aero gas turbine engines, marine gas turbine engines, and land-based gas turbine engines.

Figure 2:
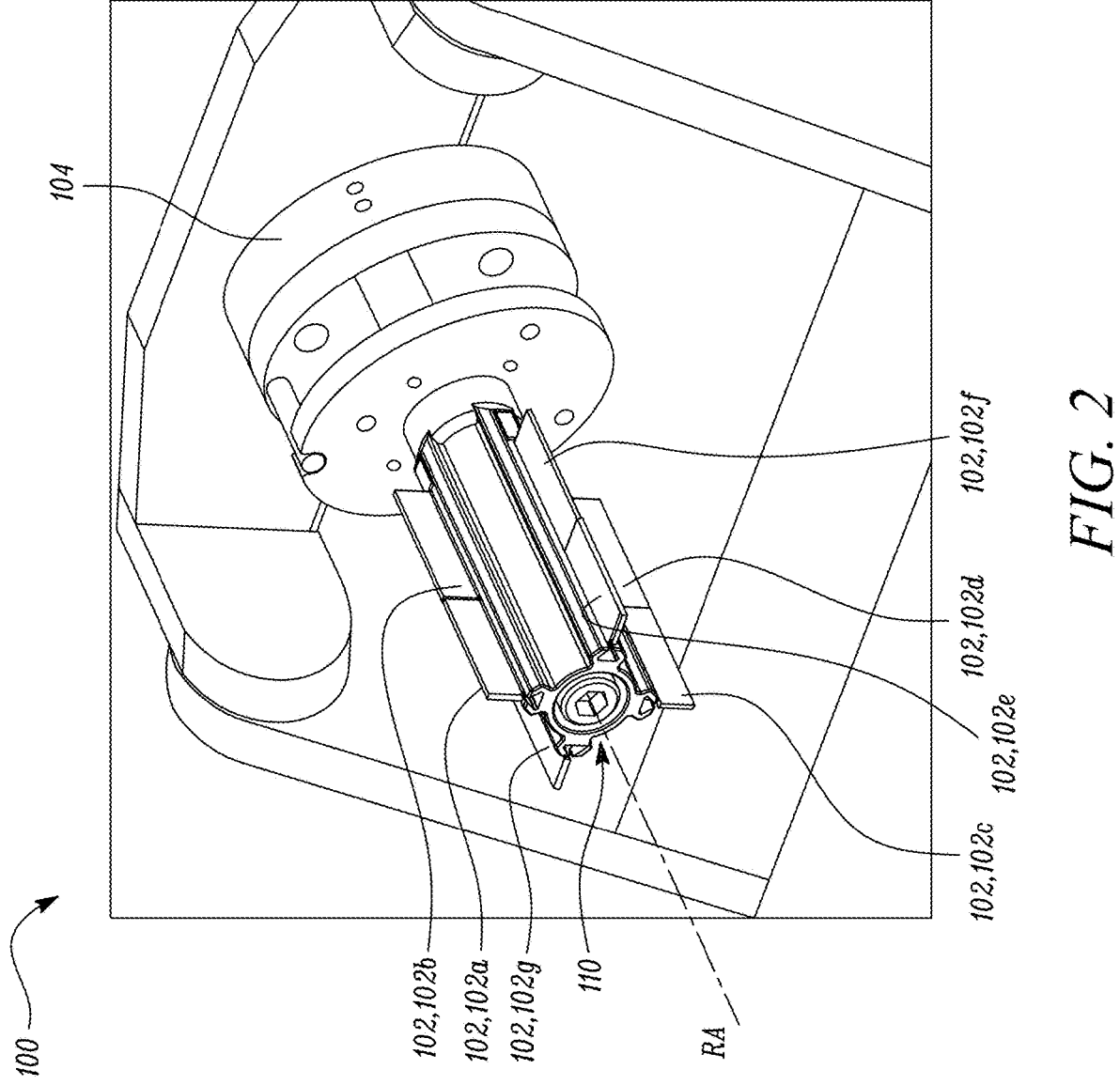
FIG. 2 is a schematic perspective view of an inspection system, a fixture and a plurality of components mounted on the inspection system, according to an embodiment of the present disclosure.

FIG. 2 is a schematic view of an inspection system 100. In some embodiments, the inspection system 100 allows non-contact testing of a plurality of components 102. In the illustrated embodiment of FIG. 2, the plurality of components 102 includes the components 102a, 102b, 102c, 102d, 102e, 102f, 102g, 102h (component 102h visible in FIG. 9B). However, it should be understood that the plurality of components 102 may include any number of the components 102.

In the inspection system 100, certain techniques such as dimensional assessment, remote visual inspections, x-ray inspection, laser inspection, ultrasonic inspection, eddy current inspection, and the like, may be used to analyse and detect size, geometry, surface, and dimensions of the plurality of component 102 or various features of the plurality of component 102. In some embodiments, the inspection system 100 may also be used to detect a variety of conditions, including, but not limited to, corrosion, wear and tear, cracking, leaks, and so on.

In the illustrated embodiment of FIG. 2, the inspection system 100 is used for dimensional assessment of the plurality of components 102. For example, the inspection system 100 may be used for determining dimensions of cooling passages within the plurality of components 102. In some embodiments, the inspection system 100 may be a non-contact measurement system which requires a line-of-sight access to scan regions of interest. In some embodiments, the regions of interest may be scanned via the inspection system 100 and the scans obtained may be processed for verification.

In some embodiments, the inspection system 100 includes a holder 104 and a fixture 110 for mounting the plurality of components 102. In some embodiments, the holder 104 of the inspection system 100 includes a rotational axis RA, such that the plurality of components 102 may be rotated about the rotational axis as the plurality of components 102 are assessed via the inspection system 100.

In some embodiments, each of the plurality of components 102 is a prototype of a part of the gas turbine engine 10 (shown in FIG. 1). For example, the part may be a combustor tile of the gas turbine engine 10. In some embodiments, the prototype may be produced using additive layer manufacturing (ALM) techniques. In some embodiments, the prototype may be bisected along its axis of symmetry before mounting on the fixture 110 in order to provide a line of sight to an internal geometry of the prototype. In some embodiments, the prototype may be produced as bisected via the ALM techniques or may be bisected afterwards via post processing techniques, such as, for example, wire electro-discharge machining (WEDM). In some embodiments, the prototype may be built at a same or a similar angle as the full part of the gas turbine engine 10 though any bulk curvature of the part may be removed.

Figure 3:
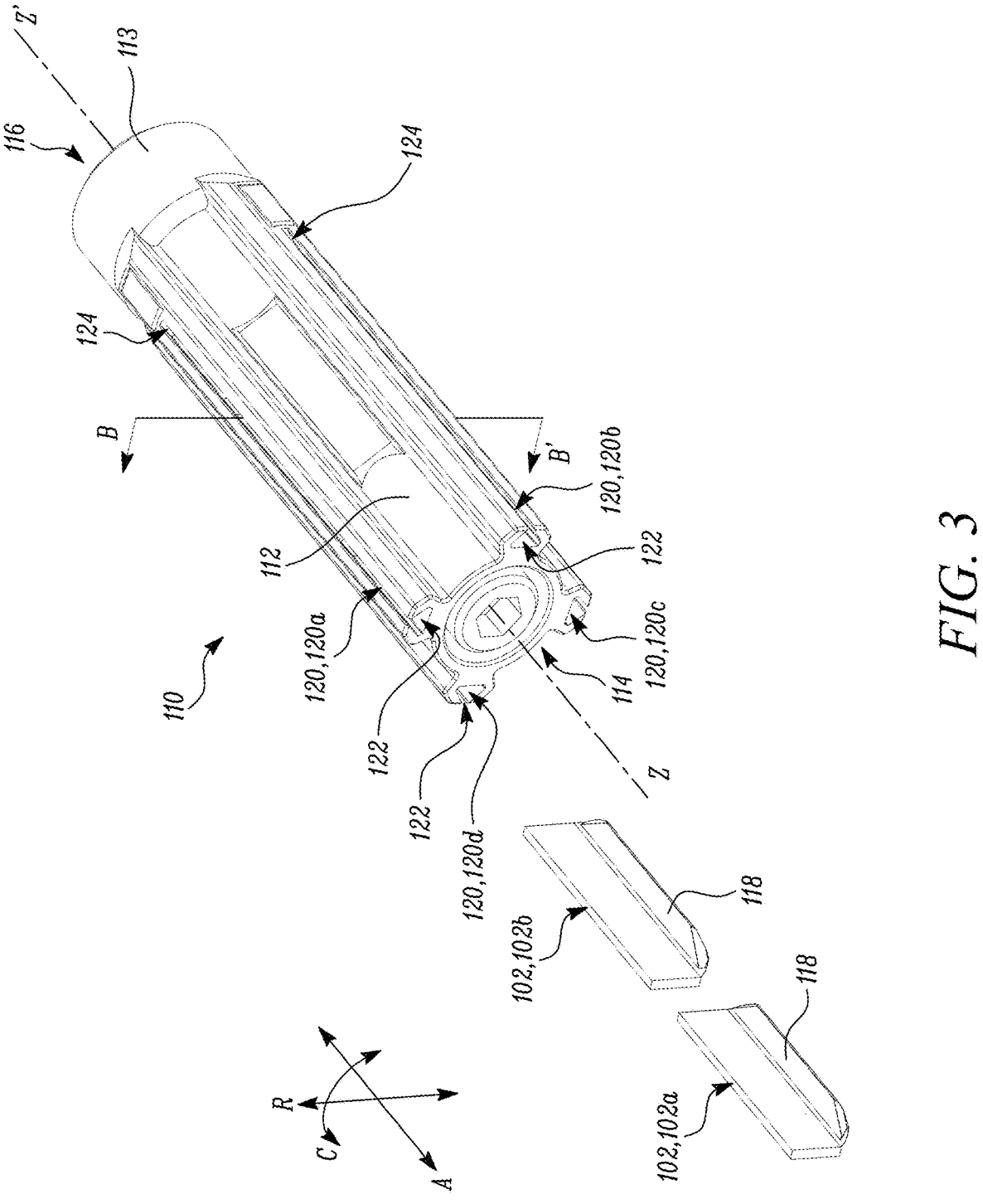
FIG. 3 is a schematic perspective view of the fixture e.g. of the inspection system of FIG. 2, and two of the plurality of components spaced apart from the fixture, according to an embodiment of the present disclosure.

FIG. 3 is a schematic perspective view of the fixture 110, e.g. of the inspection system of FIG. 2, and two of the plurality of components 102 spaced apart from the fixture 110. The components 102a, 102b from the plurality of components 102 are shown for the purpose of illustration. The fixture 110 is used for removably securing the plurality of components 102.

The fixture 110 includes a hollow body 112 defining a central axis Z-Z'. In some embodiments, the central axis Z-Z' may coincide with the rotational axis RA (shown in FIG. 2) of the holder 104 (shown in FIG. 2). In some embodiments, the hollow body 112 is in the form of a hollow cylinder. The hollow body 112 includes a first axial end 114 and a second axial end 116 axially spaced apart from the first axial end 114 with respect to the central axis Z-Z'. In some embodiments, the hollow body 112 is removably secured to the holder 104 (shown in FIG. 2) at the second axial end 116. Specifically, the hollow body 112 further includes an annular securing portion 113 disposed at the second axial end 116 and configured to be removably secured to the holder 104.

An axial direction A is defined that is aligned with the central axis Z-Z'. As used herein, terms that refer to an axial direction, such as "axially disposed", "axially extends", "axially spaced apart", "axially proximal", "axially between", "extend axially", and "extending axially" are with respect to the axial direction A. A radial direction R is defined with respect to the central axis Z-Z' perpendicular to the axial direction A. As used herein, terms that refer to a radial direction, such as "radially outer", "radially outside", "radially inner", "radially extends", "radially inwards", "radially outwards", "radially outwardly", "radially spaced apart", "radially proximal", "extend radially", and "extending radially" are with respect to the radial direction R. A circumferential direction C is defined with respect to the central axis Z-Z' perpendicular to each of the axial direction A and the radial direction R. As used herein, terms that refer to a circumferential direction, such as "circumferentially extends", "circumferentially extending", "circumferentially surrounding", "circumferentially inclined", "circumferentially with respect to", and "circumferentially disposed between" are with respect to the circumferential direction C.

The hollow body 112 further includes a plurality of channels 120 axially extending from the first axial end 114 at least partially towards the second axial end 116 along the central axis Z-Z' and angularly spaced apart from each other with respect to the central axis Z-Z'. In some embodiments, the plurality of channels 120 include at least three channels 120 equiangularly spaced around the central axis Z-Z'. In the illustrated embodiment of FIG. 3, the hollow body 112 includes four channels 120a, 120b, 120c, 120d equiangularly spaced around the central axis Z-Z'. However, it should be understood that the hollow body 112 may include any number of the channels 120 (e.g., four, five, six, eight, etc) angularly spaced apart from each other with respect to the central axis Z-Z'.

In some embodiments, each channel 120 extends between an open end 122 disposed at the first axial end 114 of the hollow body 112 to a closed end 124 disposed proximal to the second axial end 116 of the hollow body 112. In some embodiments, each channel 120 from the plurality of channels 120 is configured to at least partially and slidably receive therein from the first axial end 114 at least two of the plurality of components 102 disposed adjacent to each other with respect to the central axis Z-Z' as shown in FIG. 2. In the illustrated embodiment of FIG. 3, each channel 120a, 120b, 120c, 120d from the plurality of channels 120 is configured to at least partially and slidably receive therein two components 102. For example, the channel 120a may receive the components 102a, 102b. However, it should be understood that each channel 120 may at least partially and slidably receive any number of the component 102 based on application requirements.

Figure 4:
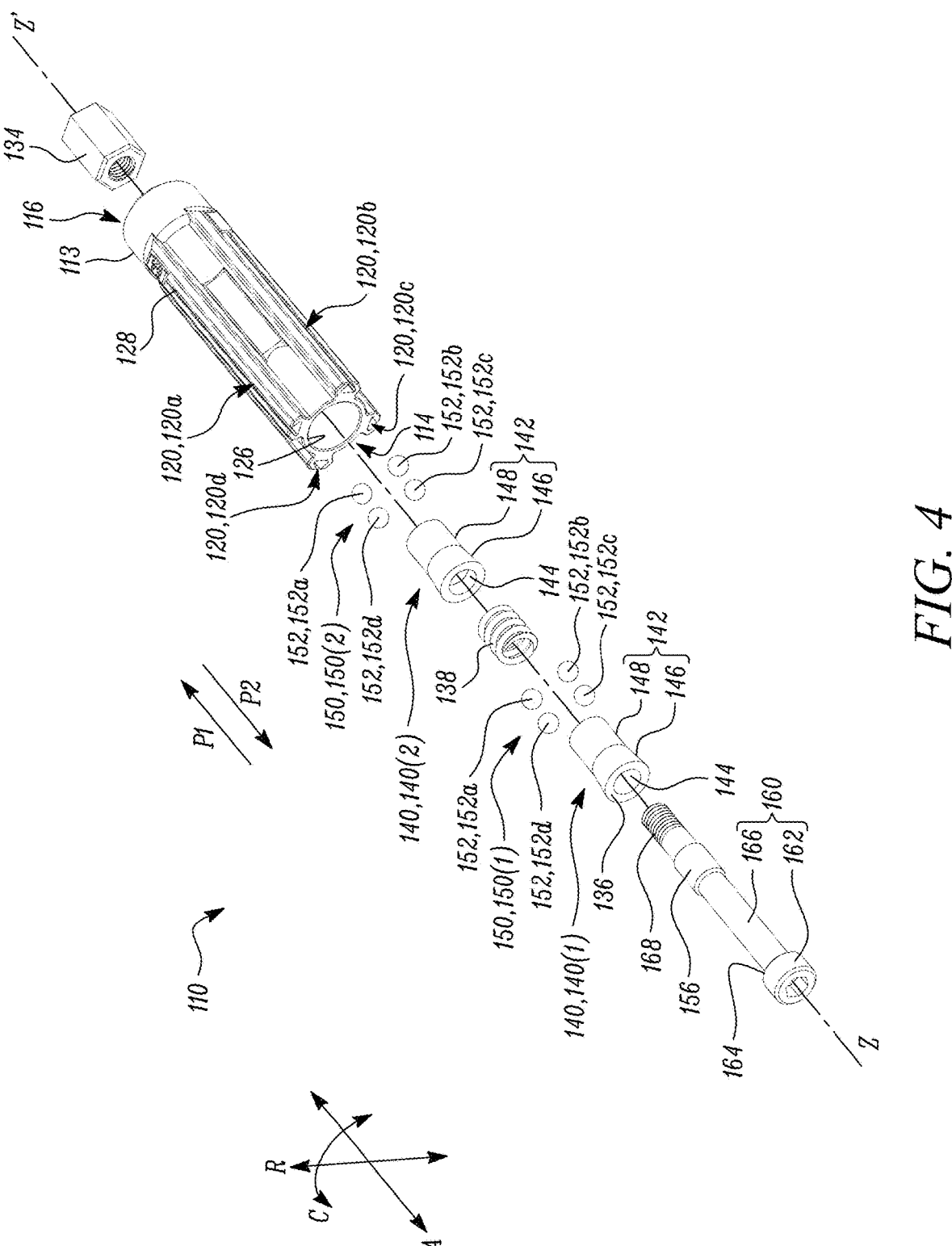
FIG. 4 is a schematic exploded perspective view of the fixture of FIG. 3.
Figure 5:
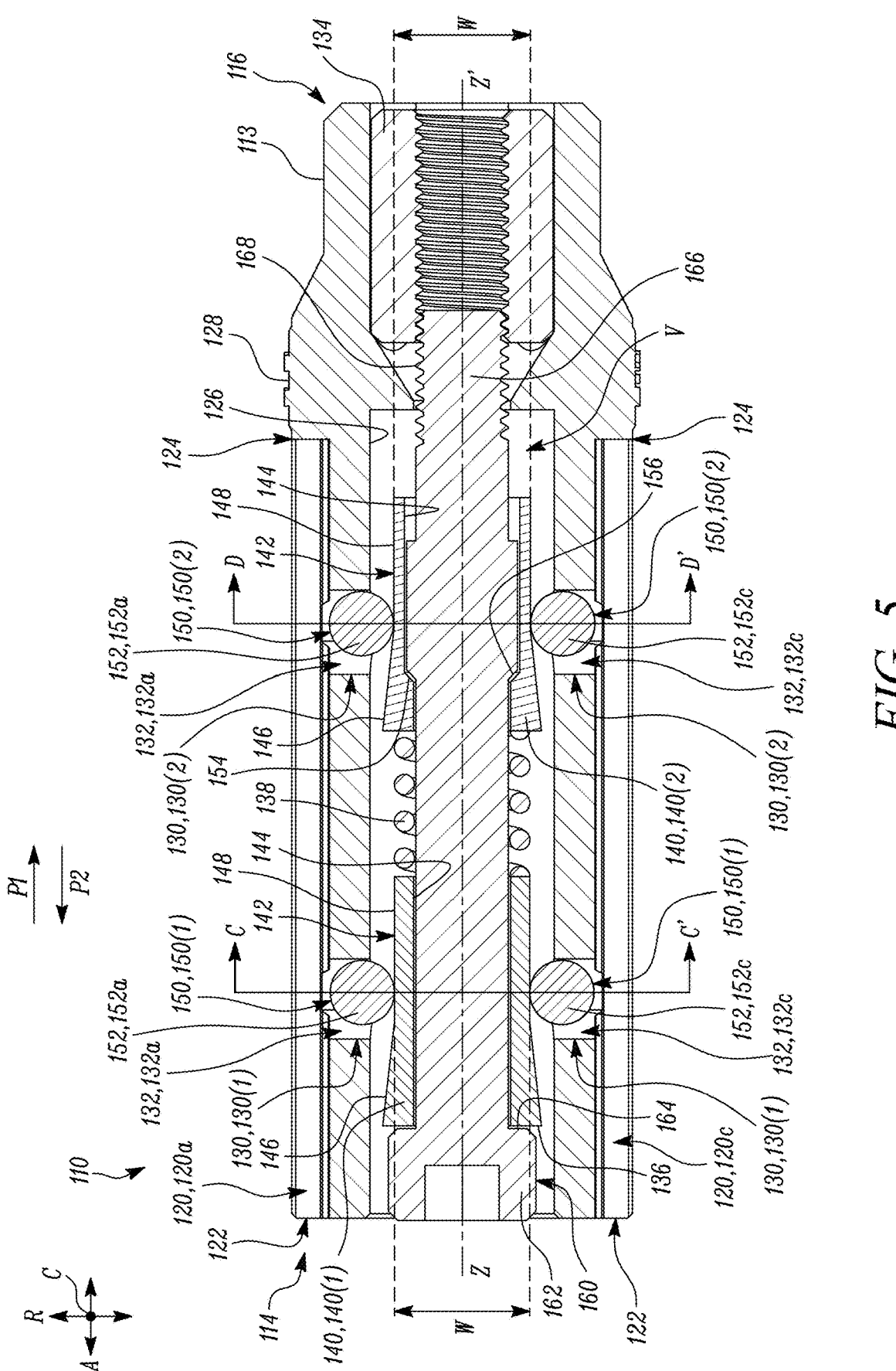
FIG. 5 is a schematic sectional side view of the fixture of FIGS. 3 and 4 taken along a section line B-B' shown in FIG. 4.
Figure 6A:
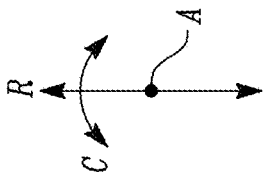
FIG. 6A is a schematic sectional view of the fixture of FIGS. 3 to 5 taken along a section line C-C' shown in FIG. 5.
Figure 6B:
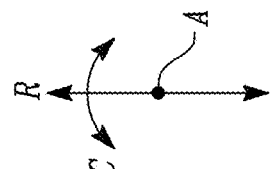
FIG. 6B is a schematic sectional view of the fixture of FIGS. 3 to 6A taken along a section line D-D' shown in FIG. 5.

FIG. 4 is a schematic exploded perspective view of the fixture 110 of FIG. 3, e.g. of the inspection system of FIG. 2. FIG. 5 is a schematic sectional side view of the fixture 110 of the FIGS. 3 and 4 taken along a section line B-B' shown in FIG. 3. FIG. 6A is a schematic sectional view of the fixture 110 taken along a section line C-C' shown in FIG. 5. FIG. 6B is a schematic sectional view of the fixture 110 taken along a section line D-D' shown in FIG. 5. A first direction P1 is defined from the first axial end 114 to the second axial end 116, and a second direction P2 is defined opposite to the first direction P1.

Referring to FIGS. 4-6B, the hollow body 112 includes an inner surface 126 defining an interior volume V (shown in FIG. 5) of the hollow body 112. The hollow body 112 further includes an outer surface 128 disposed radially outwards from the inner surface 126 with respect to the central axis Z-Z'. The plurality of channels 120 (i.e., the channels 120a, 120b, 120c, 120d) are disposed on the outer surface 128 and radially extend partially towards the inner surface 126 as shown in FIGS. 6A and 6B.

In some embodiments, each channel 120 includes a groove feature 121 (shown in FIGS. 6A and 6B) complementary to a tongue feature 118 (shown in FIG. 3) of each of the plurality of components 102 (shown in FIG. 3). Thus, the tongue feature 118 of each of the plurality of components 102 allows each component 102 to be slidably received within the corresponding channel 120 from the open end 122 of the corresponding channel 120. In some embodiments, the groove feature 121 includes a dovetail geometry. Further, the tongue feature 118 of each of the plurality of components 102 includes a dovetail receivable within the dovetail geometry. In some embodiments, the groove feature 121 is configured to lockingly engage with the tongue feature 118 of the corresponding at least two of the plurality of components 102 (shown in FIG. 3).

The hollow body 112 further includes a plurality of sets of holes 130 (shown in FIGS. 5-6B) axially spaced apart from each other with respect to the central axis Z-Z'. In the illustrated embodiment of FIG. 5, the hollow body 112 includes two sets of holes 130(1), 130(2). However, it should be understood that the hollow body 112 may include any number of sets of holes 130. The set of holes 130(1) is disposed proximal to the first axial end 114, while the set of holes 130(2) is disposed proximal to the second axial end 116.

Each set of holes 130 from the plurality of sets of holes 130 includes a plurality of holes 132 corresponding to the plurality of channels 120 and angularly spaced apart from each other with respect to the central axis Z-Z'. In some embodiments, each set of holes 130(1), 130(2) includes at least three holes 132 equiangularly spaced around the central axis Z-Z'. In the illustrated embodiment of FIGS. 5-6B, each set of holes 130(1), 130(2) includes four holes 132a, 132b, 132c, 132d corresponding to the four channels 120a, 120b, 120c, 120d. However, it should be understood that each set of holes 130 may include any number of the holes 132 based on the number of channels 120.

Each hole 132 of each set of holes 130 extends from the inner surface 126 partially towards the outer surface 128 and communicates with the corresponding channel 120 from the plurality of channels 120. For example, the hole 132a extends from the inner surface 126 partially towards the outer surface 128 and communicates with the channel 120a, the hole 132c extends from the inner surface 126 partially towards the outer surface 128 and communicates with the channel 120c, and so on. Therefore, the holes 132a, 132b, 132c, 132d communicate with the channels 120a, 120b, 120c, 120d, respectively.

The fixture 110 further includes a plurality of hollow wedges 140 corresponding to the plurality of sets of holes 130 and axially spaced apart from each other with respect to the central axis Z-Z'. In the illustrated embodiments of FIGS. 4-6B, the fixture 110 includes two hollow wedges 140(1), 140(2) corresponding to the two sets of holes 130(1), 130(2). Specifically, the plurality of hollow wedges 140 includes a first hollow wedge 140(1) disposed proximal to the first axial end 114 and a second hollow wedge 140(2) disposed proximal to the second axial end 116.

Each hollow wedge 140 from the plurality of hollow wedges 140 is movably disposed within the interior volume V of the hollow body 112. Each hollow wedge 140 includes an outer wedge surface 142 facing the inner surface 126 of the hollow body 112 and an inner wedge surface 144 opposing the outer wedge surface 142. The outer wedge surface 142 includes a frustoconical surface portion 146 extending circumferentially around the central axis Z-Z'. In some embodiments, the frustoconical surface portion 146 of each hollow wedge 140 tapers inwardly towards the central axis Z-Z' in the first direction P1.

In some embodiments, the outer wedge surface 142 of each hollow wedge 140 further includes a uniform surface portion 148 extending from the frustoconical surface portion 146 towards the second axial end 116 of the hollow body 112. In some embodiments, the uniform surface portion 148 includes a uniform outer width W (shown in FIG. 5) about the central axis Z-Z'. In the illustrated example, the uniform surface portion 148 is annular, and hence, the uniform outer width W corresponds to a diameter of the uniform surface portion 148. In some embodiments, the frustoconical surface portion 146 tapers outwardly from the uniform surface portion 148 towards the first axial end 114 of the hollow body 112. In some embodiments, a width of the frustoconical surface portion 146 increases from the uniform surface portion 148 towards the first axial end 114 of the hollow body 112 in the second direction P2.

The fixture 110 further incudes a plurality of sets of balls 150 corresponding to the plurality of sets of holes 130 and axially spaced apart from each other with respect to the central axis Z-Z'. In the illustrated embodiment of FIGS.

4-6B, the fixture 110 includes two set of balls 150(1), 150(2) corresponding to the two sets of holes 130(1), 130(2). The set of balls 150(1) is proximal to the first axial end 114, while the set of balls 150(2) is proximal to the second axial end 116. Each set of balls 150 from the plurality of sets of balls 150 includes a plurality of balls 152 corresponding to the plurality of holes 132 of the corresponding set of holes 130 and angularly spaced apart from each other with respect to the central axis Z-Z'. Each ball 152 of each set of balls 150 is configured to engage with a corresponding component 102 from the plurality of components 102 (shown in FIGS. 2 and 3).

In some embodiment, each set of balls 150 includes at least three balls 152. In the illustrated embodiment of FIGS. 4-6B, each set of balls 150(1), 150(2) includes four balls 152a, 152b, 152c, 152d corresponding to the four holes 132a, 132b, 132c, 132d. Further, each set of balls 150(1), 150(2) includes four balls 152a, 152b, 152c, 152d corresponding to the four channels 120a, 120b, 120c, 120d. However, it should be understood that each set of balls 150 may include any number of the balls 152 based on the number of channels 120 and/or the number of holes 132.

Each ball 152 of each set of balls 150 is at least partially and movably received within the corresponding hole 132 of the corresponding set of holes 130 and engages with the outer wedge surface 142 of the corresponding hollow wedge 140. In the illustrated embodiment of FIGS. 5-6A, each ball 152a, 152b, 152c, 152d of the set of balls 150(1) is at least partially and movably received within the corresponding hole 132a, 132b, 132c, 132d of the set of holes 130(1) and engages with the outer wedge surface 142 of the first hollow wedge 140(1). Similarly, in the illustrated embodiment of FIGS. 5 and 6B, each ball 152a, 152b, 152c, 152d of the set of balls 150(2) is at least partially and movably received within the corresponding hole 132a, 132b, 132c, 132d of the set of holes 130(2) and engages with the outer wedge surface 142 of the second hollow wedge 140(2).

The fixture 110 further includes an elongate member 160 at least partially received within the interior volume V of the hollow body 112 and extending along the central axis Z-Z'. In some embodiments, the elongate member 160 is in the form of a partially threaded bolt. The elongate member 160 is axially movable along the central axis Z-Z'. In some embodiments, the elongate member 160 is threadingly engaged with the hollow body 112 and configured to move axially relative to the hollow body 112 upon rotation about the central axis Z-Z'.

The elongate member 160 is at least partially received within each hollow wedge 140 and is disposed adjacent to the inner wedge surface 144 of each hollow wedge 140. In the illustrated embodiment of FIG. 5, the elongate member 160 is at least partially received within the first hollow wedge 140(1) and the second hollow wedge 140(2) and is disposed adjacent to the inner wedge surface 144 of each of the first and second hollow wedges 140(1), 140(2).

The elongate member 160 is axially engaged with the first hollow wedge 140(1). In some embodiments, the elongate member 160 includes a head 162 disposed proximal to the first axial end 114 of the hollow body 112 and axially engaging with the first hollow wedge 140(1), and a shaft 166 extending from the head 162 and disposed adjacent to the inner wedge surface 144 of each hollow wedge 140. In some embodiments, the head 162 of the elongate member 160 includes a head end surface 164 (shown in FIGS. 4 and 5) disposed around the shaft 166. The head 162 therefore has a greater radial width than the shaft 166. In some embodiments, the first hollow wedge 140(1) includes an axial end surface 136 (shown in FIGS. 4 and 5) axially engaging with the head end surface 164 of the head 162.

In some embodiments, the hollow body 112 further includes an internally threaded portion 134 fixedly disposed within the interior volume V of the hollow body 112. In the illustrated example, the internally threaded portion 134 is an insert connected to a rest of the hollow body 112. Alternatively, the internally threaded portion 134 may be integral with the rest of the hollow body 112. In some embodiments, the shaft 166 includes an externally threaded portion 168 disposed proximal to the second axial end 116 of the hollow body 112 and threadingly engaged with the hollow body 112. Specifically, the externally threaded portion 168 of the shaft 166 is threadingly engaged with the internally threaded portion 134 of the hollow body 112. Therefore, in the illustrated example, the elongate member 160 is a threaded bolt.

In some embodiments, the shaft 166 receives the plurality of hollow wedges 140 thereon between the head 162 and the externally threaded portion 168. In the illustrated embodiment of FIGS. 4-6B, the shaft 166 receives the first hollow wedge 140(1) and the second hollow wedge 140(2) thereon between the head 162 and the externally threaded portion 168. In some embodiments, the shaft 166 is rotatable about the central axis Z-Z' relative to the plurality of hollow wedges 140.

The fixture 110 further includes one or more elastic members 138 disposed within the interior volume V of the hollow body 112 and around the elongate member 160. Each elastic member 138 from the one or more elastic members 138 axially extends between and engages with a corresponding pair of axially adjacent hollow wedges 140 from the plurality of hollow wedges 140. In some embodiments, each elastic member 138 is a coil spring. However, it should be understood that the elastic member 138 may be any other type of elastically deformable device, e.g., a wave spring, an elastic corrugated pipe, etc.

In the illustrated embodiment of FIGS. 4 and 5, the fixture 110 includes one elastic member 138 disposed within the interior volume V of the hollow body 112 and around the elongate member 160. The one elastic member 138 axially extends between and engages with the first hollow wedge 140(1) and the second hollow wedge 140(2). However, it should be understood that the fixture 110 may include any number of the elastic members 138 disposed around the elongate member 160 based on a number of the hollow wedges 140. Specifically, the number of the elastic members 138 may be one less than the number of the hollow wedges 140.

In some embodiments, the second hollow wedge 140(2) further includes an engaging feature 154 (shown in FIG. 5) disposed at the inner wedge surface 144. In some embodiments, the engaging feature 154 of the second hollow wedge 140(2) is an annular recess. However, the engaging feature 154 may also include any other suitable form. In some embodiments, the shaft 166 of the elongate member 160 further includes a complementary engaging feature 156 configured to engage with the engaging feature 154 of the second hollow wedge 140(2). In some embodiments, the complementary engaging feature 156 of the shaft 166 is an annular projection. In some embodiments, the annular projection may extend from the shaft 166 away from the central axis Z-Z'.

In some embodiments, the shaft 166 is axially movable along the central axis Z-Z' in the first direction P1 relative to the plurality of hollow wedges 140. In some embodiments, the shaft 166 is axially movable along the central axis Z-Z' in the second direction P2 relative to the plurality of hollow wedges 140 apart from the second hollow wedge 140(2) since the complementary engaging feature 156 of the shaft 166 of the elongate member 160 may engage with the engaging feature 154 of the second hollow wedge 140(2) upon axial movement of the shaft 166 along the central axis Z-Z' in the second direction P2, thereby axially moving the second hollow wedge 140(2) along the second direction P2.

Figure 7:
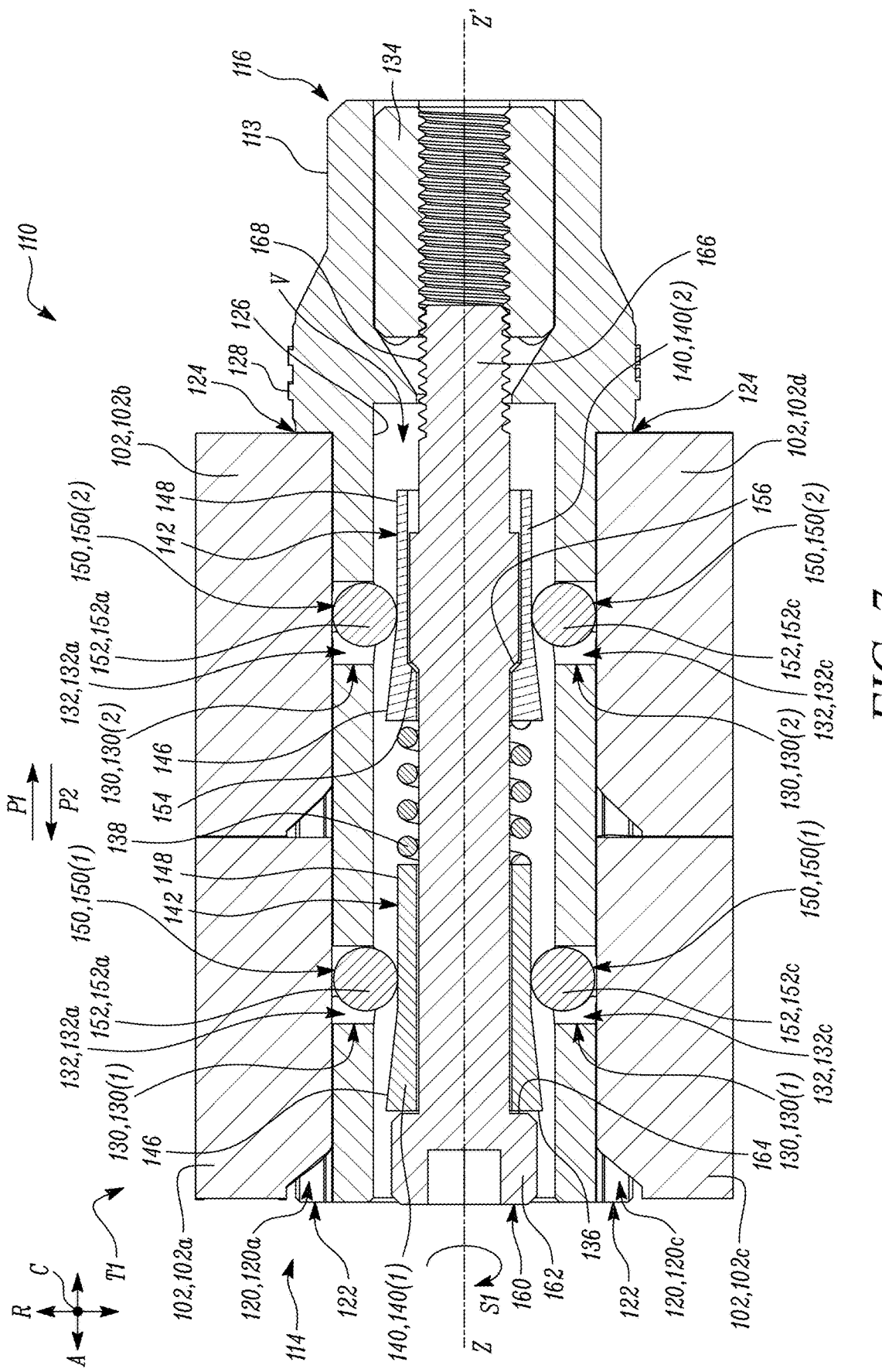
FIG. 7 is a schematic sectional side view of the fixture of FIGS. 3 to 6B and the plurality of components of FIG. 2 in an unlocked configuration of the fixture.

FIG. 7 is a schematic sectional side view of the fixture 110 and the plurality of components 102 in an unlocked configuration T1 of the fixture 110. Components 102a, 102b, 102c, 102d from the plurality of components 102 are shown in FIG. 7 for the purpose of illustration. In some embodiments, the closed end 124 of each channel 120 is configured to engage with the corresponding adjacent component 102, thereby acting as an axial stop for the corresponding adjacent component 102. In the illustrated embodiment of FIG. 7, the closed end 124 of each of the channels 120a, 120c is configured to engage with the corresponding adjacent component 102b, 102d, thereby acting as the axial stop for the corresponding adjacent component 102b, 102d.

Further, the balls 152a, 152c are visible from each set of balls 150(1), 150(2) and the channels 120a, 120c are visible from the plurality of channels 120a, 120b, 120c, 120d. In some embodiments, in the unlocked configuration T1 of the fixture 110, the uniform surface portion 148 of each hollow wedge 140 engages each ball 152 of the corresponding set of balls 150, such that each ball 152 of the corresponding set of balls 150 is radially spaced apart from the corresponding channel 120 and disengaged from the corresponding component 102.

In the illustrated embodiment of FIG. 7, the uniform surface portion 148 of the first hollow wedge 140(1) engages each ball 152a, 152c (visible in FIG. 7) of the set of balls 150(1), such that each ball 152a, 152c is radially spaced apart from the corresponding channel 120a, 120c (visible in FIG. 7) and disengaged from the corresponding component 102a, 102c. Further, the uniform surface portion 148 of the second hollow wedge 140(2) engages each ball 152a, 152c (visible in FIG. 7) of the set of balls 150(2), such that each ball 152a, 152c is radially spaced apart from the corresponding channel 120a, 120c and disengaged from the corresponding component 102b, 102d.

Figure 8:
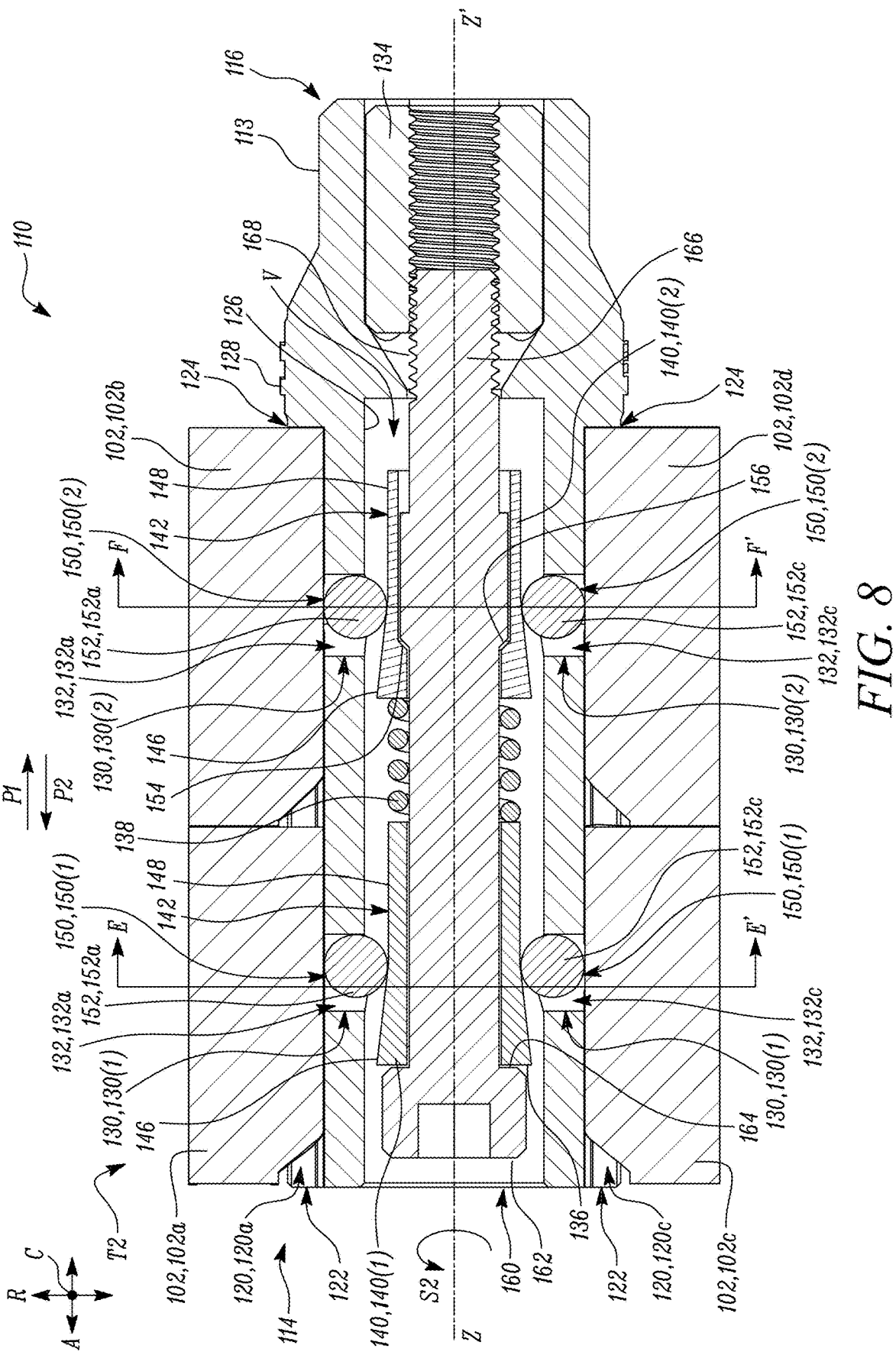
FIG. 8 is a schematic sectional side view of the fixture of FIGS. 3 to 7 and the plurality of components of FIG. 2 in a locked configuration of the fixture.
Figure 9A:
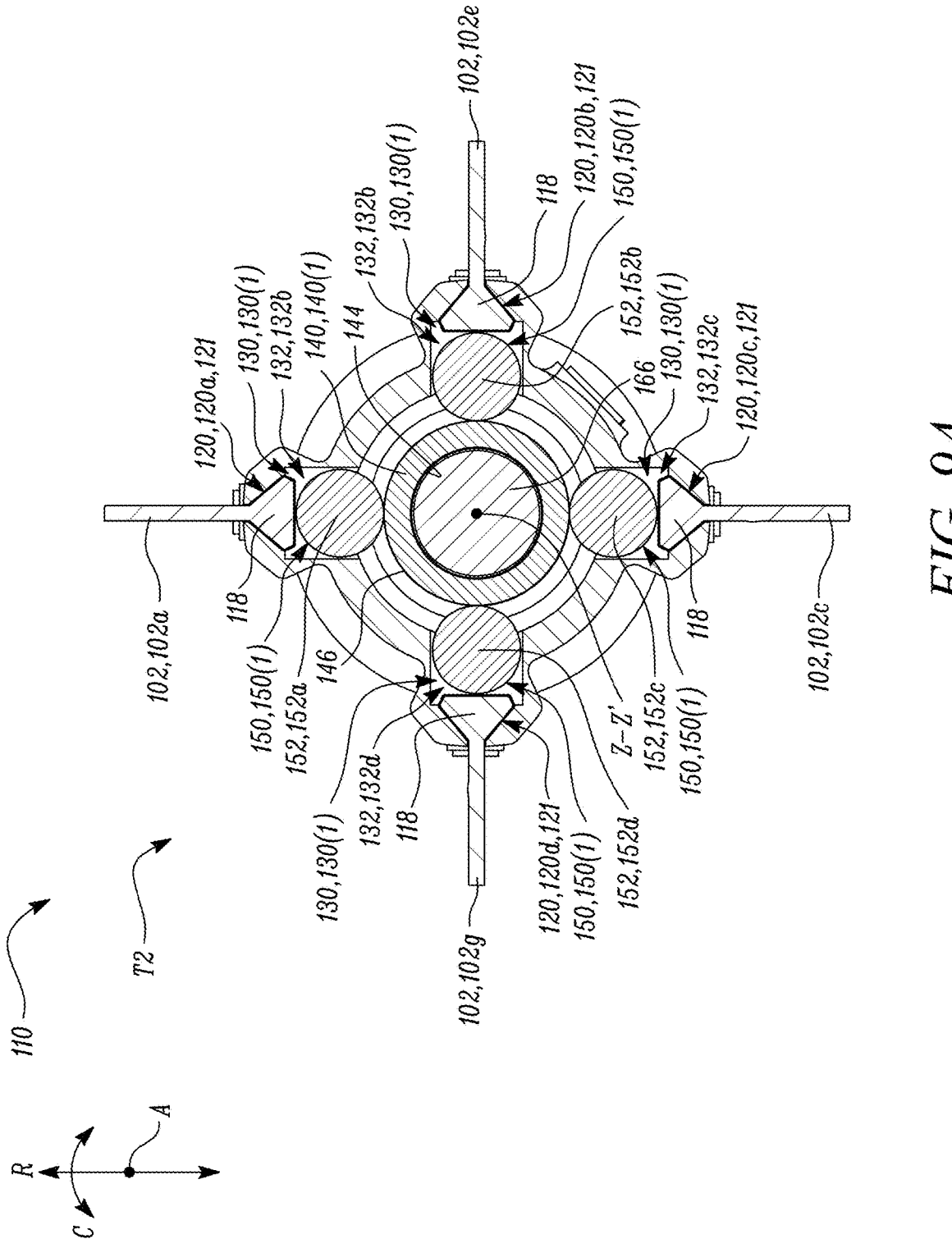
FIG. 9A is a schematic sectional view of the fixture of FIGS. 3 to 8 and the plurality of components of FIG. 2 taken along a section line E-E' shown in FIG. 8.
Figure 9B:
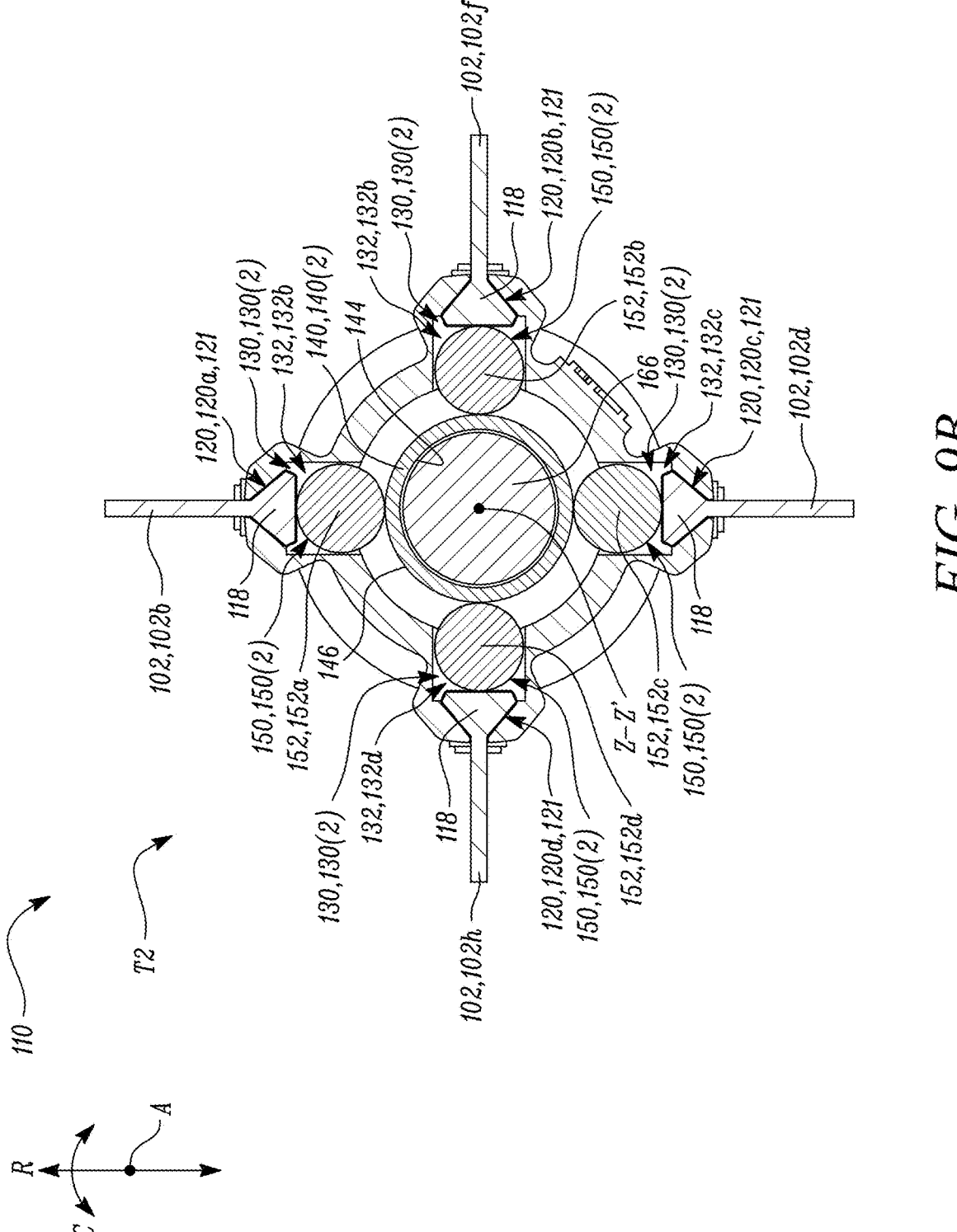
FIG. 9B is a schematic sectional view of the fixture of FIGS. 3 to 9A and the plurality of components of FIG. 2 taken along a section line F-F' shown in FIG. 8.

FIG. 8 is a schematic sectional side view of the fixture 110 and the plurality of components 102 in a locked configuration T2 of the fixture 110. FIG. 9A is a schematic sectional view of the fixture 110 and the plurality of components 102a, 102c, 102e, 102g taken along a section line E-E' shown in FIG. 8. FIG. 9B is a schematic sectional view of the fixture 110 and the plurality of components 102b, 102d, 102f, 102h taken along a section line F-F' shown in FIG. 8.

Referring to FIGS. 8-9B, in some embodiments, in the locked configuration T2 of the fixture 110, the frustoconical surface portion 146 of each hollow wedge 140 engages each ball 152 of the corresponding set of balls 150, such that each ball 152 of the corresponding set of balls 150 extends at least partially into the corresponding channel 120 and engages the corresponding component 102.

In the illustrated embodiment of FIGS. 8 and 9A, the frustoconical surface portion 146 of the first hollow wedge 140(1) engages each ball 152a, 152b, 152c, 152d of the set of balls 150(1), such that each ball 152a, 152b, 152c, 152d extends at least partially into the corresponding channel 120a, 120b, 120c, 120d and engages the corresponding component 102a, 102c, 102e, 102g. Specifically, each ball 152a, 152b, 152c, 152d of the set of balls 150(1) extends at least partially into the corresponding channel 120a, 120b, 120c, 120d and engages the tongue feature 118 of the corresponding component 102a, 102c, 102e, 102g, thereby forcing the tongue feature 118 of the corresponding component 102a, 102c, 102e, 102g radially outwards with respect to the central axis Z-Z' in the corresponding channel 120a, 120b, 120c, 120d.

Similarly, in the illustrated embodiment of FIGS. 8 and 9B, the frustoconical surface portion 146 of the second hollow wedge 140(2) engages each ball 152a, 152b, 152c, 152d of the set of balls 150(2), such that each ball 152a, 152b, 152c, 152d extends at least partially into the corresponding channel 120a, 120b, 120c, 120d and engages the corresponding component 102b, 102d, 102f, 102h. Specifically, each ball 152a, 152b, 152c, 152d of the set of balls 150(2) extends at least partially into the corresponding channel 120a, 120b, 120c, 120d and engages the tongue feature 118 of the corresponding component 102b, 102d, 102f, 102h, thereby forcing the tongue feature 118 of the corresponding component 102b, 102d, 102f, 102h radially outwards with respect to the central axis Z-Z' in the corresponding channel 120a, 120b, 120c, 120d.

Referring to FIGS. 7-9B, upon an axial movement of the elongate member 160 in the first direction P1 from the first axial end 114 to the second axial end 116, the elongate member 160 axially moves the first hollow wedge 140(1) in the first direction P1, thereby causing the one or more elastic members 138 to be sequentially compressed along the first direction P1 and sequentially move the hollow wedges 140 subsequent to the first hollow wedge 140(1) in the first direction P1. In some embodiments, the elongate member 160 moves axially relative to the hollow body 112 upon rotation about the central axis Z-Z' in a first rotational direction S1. The one or more elastic members 138 may be therefore successively compressed along the first direction P1 leading to successive axial movements of the subsequent hollow wedges 140 along the first direction P1.

Upon the axial movement of each hollow wedge 140, in the first direction P1, the frustoconical surface portion 146 of each hollow wedge 140 moves the corresponding set of balls 150 radially outwards with respect to the central axis Z-Z' within the corresponding set of holes 130, such that each ball 152 of the corresponding set of balls 150 extends at least partially into the corresponding channel 120, thereby engaging and moving the corresponding component 102 into locking engagement with the corresponding channel 120 as shown in FIGS. 8-9B.

In the illustrated embodiment of FIGS. 7-9B, upon the axial movement of the elongate member 160 in the first direction P1, the elongate member 160 axially moves the first hollow wedge 140(1) in the first direction P1, thereby causing the elastic member 138 to be compressed along the first direction P1 and move the second hollow wedge 140(2) in the first direction P1. Since the head end surface 164 of the head 162 of the elongate member 160 is axially engaged with the axial end surface 136 of the first hollow wedge 140(1), the elongate member 160 axially moves the first hollow wedge 140(1) in the first direction P1 upon rotation about the central axis Z-Z' in the first rotational direction S1.

Upon the axial movement of the second hollow wedge 140(2) in the first direction P1, the frustoconical surface portion 146 of the second hollow wedge 140(2) moves the set of balls 150(2) radially outwards with respect to the central axis Z-Z' within the set of holes 130(2), such that each ball 152a, 152b, 152c, 152d (shown in FIG. 9B) of the set of balls 150(2) extends at least partially into the corresponding channel 120a, 120b, 120c, 120d, thereby engaging and moving the corresponding component 102*b*, 102*d*, 102*e*, 102*g* into locking engagement with the corresponding channel 120*a*, 120*b*, 120*c*, 120*d*.

In some embodiments, the compressed elastic member 138 axially moves the second hollow wedge 140(2) in the first direction P1 until the frustoconical surface portion 146 of the second hollow wedge 140(2) moves each ball 152*a*, 152*b*, 152*c*, 152*d* of the set of balls 150(2) radially outwards with respect to the central axis Z-Z' within the set of holes 130(2), thereby engaging and moving the corresponding component 102*b*, 102*d*, 102*f*, 102*h* into locking engagement with the corresponding channel 120*a*, 120*b*, 120*c*, 120*d*. The second hollow wedge 140(2) may not be able to further move along the first direction P1 thereupon.

Upon subsequent axial movement of the elongate member 160 and the first hollow wedge 140(1) in the first direction P1, the elastic member 138 may further compress while the frustoconical surface portion 146 of the first hollow wedge 140(1) moves each ball 152*a*, 152*b*, 152*c*, 152*d* (shown in FIG. 9A) of the set of balls 150(1) radially outwards with respect to the central axis Z-Z' within the set of holes 130(1), thereby engaging and moving the corresponding component 102*a*, 102*c*, 102*e*, 102*g* into locking engagement with the corresponding channel 120*a*, 120*b*, 120*c*, 120*d*. The first hollow wedge 140(1) and the elongate member 160 may not be able to further move along the first direction P1 thereupon, thereby moving the fixture 110 into the locked configuration T2 shown in FIG. 8.

Referring to FIG. 8, in some embodiments, upon the axial movement of the elongate member 160 in the second direction P2 opposite to the first direction P1, the one or more elastic members 138 uncompress and move each hollow wedge 140 apart from the second hollow wedge 140(2) in the second direction P2. In some embodiments, the elongate member 160 axially moves in the second direction P2 upon rotation of the elongate member 160 in a second rotational direction S2 opposite to the first rotational direction S1. In the illustrated embodiment of FIG. 8, the elastic member 138 uncompresses and moves the first hollow wedge 140(1) in the second direction P2 upon the axial movement of the elongate member 160 in the second direction P2. In some embodiments, upon the axial movement of the elongate member 160 in the second direction P2, the complementary engaging feature 156 of the shaft 166 engages with the engaging feature 154 of the second hollow wedge 140(2), thereby moving the second hollow wedge 140(2) in the second direction P2.

In some embodiments, upon the axial movement of each hollow wedge 140 in the second direction P2, the frustoconical surface portion 146 of each hollow wedge 140 moves the corresponding set of balls 150 radially inwards with respect to the central axis Z-Z' within the corresponding set of holes 130 and releasably disengages the corresponding components 102 from the corresponding channel 120, thereby moving the fixture 110 to the unlocked configuration T1 (shown in FIG. 7).

In the illustrated embodiment of FIGS. 8-9A, upon the axial movement of the first hollow wedge 140(1) in the second direction P2, the frustoconical surface portion 146 of the first hollow wedge 140(1) moves the set of balls 150(1) radially inwards with respect to the central axis Z-Z' within the corresponding set of holes 130(1) and releasably disengages the corresponding components 102*a*, 102*c*, 102*e*, 102*g* from the corresponding channel 120*a*, 120*b*, 120*c*, 120*d*. In the illustrated embodiment of FIGS. 8-9B, upon the axial movement of the second hollow wedge 140(2) in the second direction P2, the frustoconical surface portion 146 of the second hollow wedge 140(2) moves the set of balls 150(2) radially inwards with respect to the central axis Z-Z' within the corresponding set of holes 130(2) and releasably disengages the corresponding components 102*b*, 102*d*, 102*f*, 102*h* from the corresponding channel 120*a*, 120*b*, 120*c*, 120*d*.

Figure 10:
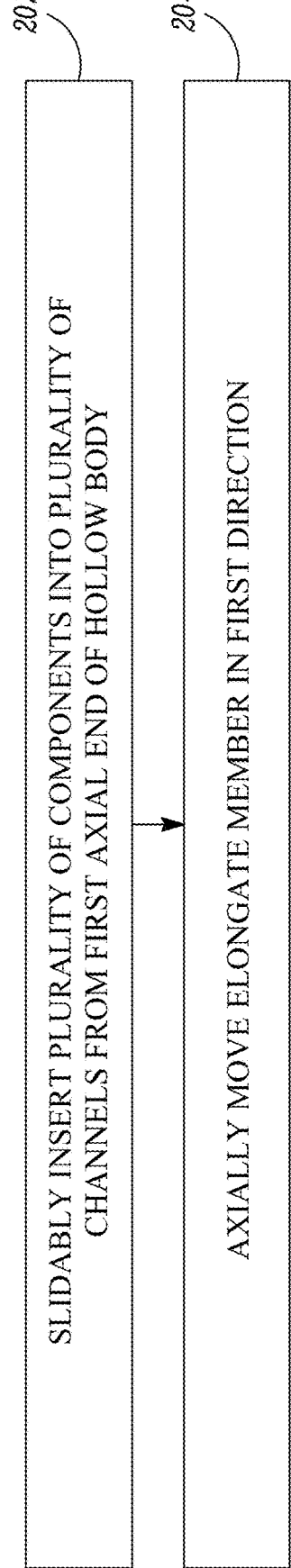
FIG. 10 is a flowchart illustrating a method for removably securing the plurality of components to the fixture, e.g. of the inspection system of FIG. 2, according to an embodiment of the present disclosure.

FIG. 10 is a flow chart illustrating a method 200 for removably securing the plurality of components 102 to the fixture 110. The method 200 will be described hereinafter with reference to the plurality of components 102 shown in FIGS. 2-3 and 7-9B, and the fixture 110 of FIGS. 2-9B. At step 202, the method 200 includes slidably inserting the plurality of components 102 into the plurality of channels 120 from the first axial end 114 of the hollow body 112, such that each channel 120 receives at least two of the plurality of components 102 disposed adjacent to each other with respect to the central axis Z-Z'. At step 204, the method 200 further includes axially moving the elongate member 160 in the first direction P1 to lockingly engage each of the plurality of components 102 with the corresponding channel 120.

Referring to FIGS. 2-9B, the plurality of channels 120 of the hollow body 112 may at least partially and slidably receive therein the corresponding at least two of the plurality of components 102 disposed adjacent to each other with respect to the central axis Z-Z'. Upon the axial movement of the elongate member 160 in the first direction P1, the plurality of hollow wedges 140 (i.e., the first hollow wedge 140(1) and the second hollow wedge 140(2) in the illustrated example) may move in the first direction P1, thereby causing the frustoconical surface portion 146 of each hollow wedge 140 to move the corresponding set of balls 150 radially outwards within the corresponding set of holes 130. This may cause each ball 152 of the corresponding set of balls 150 to extend at least partially into the corresponding channel 120, thereby engaging and moving the corresponding component 102 into locking engagement with the corresponding channel 120. This may allow the plurality of components 102 to be clamped simultaneously based on the axial movement of the elongate member 160 (i.e., a single fastener) in the first direction P1. Thus, the fixture 110 of the present disclosure may provide a simple and effective solution for clamping multiple components 102 together, thereby improving an efficiency of the fixturing the plurality of components 102 and reducing a cost of processing the plurality of components 102.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:
1. A fixture for removably securing a plurality of components, the fixture comprising:
    a hollow body defining a central axis, the hollow body comprising:
        a first axial end and a second axial end axially spaced apart from the first axial end with respect to the central axis;
        an inner surface defining an interior volume of the hollow body;
        an outer surface disposed radially outwards from the inner surface with respect to the central axis;

a plurality of channels axially extending from the first axial end at least partially towards the second axial end along the central axis and angularly spaced apart from each other with respect to the central axis, the plurality of channels disposed on the outer surface and radially extending partially towards the inner surface, wherein each channel from the plurality of channels is configured to at least partially and slidably receive therein from the first axial end at least two of the plurality of components disposed adjacent to each other with respect to the central axis; and a plurality of sets of holes axially spaced apart from each other with respect to the central axis, each set of holes from the plurality of sets of holes comprising a plurality of holes corresponding to the plurality of channels and angularly spaced apart from each other with respect to the central axis, wherein each hole of each set of holes extends from the inner surface partially towards the outer surface and communicates with the corresponding channel from the plurality of channels;

a plurality of hollow wedges corresponding to the plurality of sets of holes and axially spaced apart from each other with respect to the central axis, wherein each hollow wedge from the plurality of hollow wedges is movably disposed within the interior volume of the hollow body, wherein each hollow wedge comprises an outer wedge surface facing the inner surface of the hollow body and an inner wedge surface opposing the outer wedge surface, wherein the outer wedge surface comprises a frustoconical surface portion extending circumferentially around the central axis, the plurality of hollow wedges comprising a first hollow wedge disposed proximal to the first axial end and a second hollow wedge disposed proximal to the second axial end;

a plurality of sets of balls corresponding to the plurality of sets of holes and axially spaced apart from each other with respect to the central axis, each set of balls from the plurality of sets of balls comprising a plurality of balls corresponding to the plurality of holes of the corresponding set of holes and angularly spaced apart from each other with respect to the central axis, wherein each ball of each set of balls is at least partially and movably received within the corresponding hole of the corresponding set of holes and engages with the outer wedge surface of the corresponding hollow wedge, and wherein each ball of each set of balls is configured to engage with a corresponding component from the plurality of components;

an elongate member at least partially received within the interior volume of the hollow body and extending along the central axis, wherein the elongate member is axially movable along the central axis, wherein the elongate member is at least partially received within each hollow wedge and is disposed adjacent to the inner wedge surface of each hollow wedge, and wherein the elongate member is axially engaged with the first hollow wedge; and one or more elastic members disposed within the interior volume of the hollow body and around the elongate member, wherein each elastic member from the one or more elastic members axially extends between and engages with a corresponding pair of axially adjacent hollow wedges from the plurality of hollow wedges;

wherein, upon an axial movement of the elongate member in a first direction from the first axial end to the second axial end, the elongate member axially moves the first hollow wedge in the first direction, thereby causing the one or more elastic members to be sequentially compressed along the first direction and sequentially move the hollow wedges subsequent to the first hollow wedge in the first direction, and wherein, upon the axial movement of each hollow wedge in the first direction, the frustoconical surface portion of each hollow wedge moves the corresponding set of balls radially outwards with respect to the central axis within the corresponding set of holes, such that each ball of the corresponding set of balls extends at least partially into the corresponding channel, thereby engaging and moving the corresponding component into locking engagement with the corresponding channel.

2. The fixture of claim 1, wherein the elongate member is threadingly engaged with the hollow body and configured to move axially relative to the hollow body upon rotation about the central axis.

3. The fixture of claim 2, wherein the elongate member comprises a head disposed proximal to the first axial end of the hollow body and axially engaging with the first hollow wedge, and a shaft extending from the head and disposed adjacent to the inner wedge surface of each hollow wedge, wherein the shaft comprises an externally threaded portion disposed proximal to the second axial end of the hollow body and threadingly engaged with the hollow body, and wherein the shaft receives the plurality of hollow wedges thereon between the head and the externally threaded portion.

4. The fixture of claim 3, wherein the second hollow wedge further comprises an engaging feature disposed at the inner wedge surface, and wherein the shaft of the elongate member further comprises a complementary engaging feature configured to engage with the engaging feature of the second hollow wedge.

5. The fixture of claim 4, wherein the engaging feature of the second hollow wedge is an annular recess, and wherein the complementary engaging feature of the shaft is an annular projection.

6. The fixture of claim 4, wherein, upon the axial movement of the elongate member in a second direction opposite to the first direction:

the one or more elastic members uncompress and move each hollow wedge apart from the second hollow wedge in the second direction; and the complementary engaging feature of the shaft engages with the engaging feature of the second hollow wedge and moves the second hollow wedge in the second direction; and wherein, upon the axial movement of each hollow wedge in the second direction, the frustoconical surface portion of each hollow wedge moves the corresponding set of balls radially inwards with respect to the central axis within the corresponding set of holes and releasably disengages the corresponding components from the corresponding channel.

7. The fixture of claim 6, wherein the shaft is rotatable about the central axis relative to the plurality of hollow wedges, wherein the shaft is axially movable along the central axis in the first direction relative to the plurality of hollow wedges, and wherein the shaft is axially movable along the central axis in the second direction relative to the plurality of hollow wedges apart from the second hollow wedge.

8. The fixture of claim 3, wherein the head of the elongate member comprises a head end surface disposed around the shaft, and wherein the first hollow wedge comprises an axial end surface axially engaging with the head end surface of the head.

9. The fixture of claim 1, wherein the frustoconical surface portion of each hollow wedge tapers inwardly towards the central axis in the first direction.

10. The fixture of claim 9, wherein, in an unlocked configuration of the fixture, the uniform surface portion of each hollow wedge engages each ball of the corresponding set of balls, such that each ball of the corresponding set of balls is radially spaced apart from the corresponding channel and disengaged from the corresponding component, and wherein, in a locked configuration of the fixture, the frustoconical surface portion of each hollow wedge engages each ball of the corresponding set of balls, such that each ball of the corresponding set of balls extends at least partially into the corresponding channel and engages the corresponding component.

11. The fixture of claim 1, wherein the outer wedge surface of each hollow wedge further comprises a uniform surface portion extending from the frustoconical surface portion towards the second axial end of the hollow body, wherein the uniform surface portion comprises a uniform outer width about the central axis, and wherein the frustoconical surface portion tapers outwardly from the uniform surface portion towards the first axial end of the hollow body.

12. The fixture of claim 1, wherein each elastic member is a coil spring.

13. The fixture of claim 1, wherein:

the plurality of channels comprise at least three channels equiangularly spaced around the central axis;

each set of holes comprises at least three holes equiangularly spaced around the central axis; and each set of balls comprises at least three balls.

14. The fixture of claim 1, wherein each channel comprises a groove feature complementary to a tongue feature of each of the plurality of components, and wherein the groove feature is configured to lockingly engage with the tongue features of the corresponding at least two of the plurality of components.

15. The fixture of claim 14, wherein the groove feature comprises a dovetail geometry.

16. The fixture of claim 1, wherein the hollow body further comprises an annular securing portion disposed at the second axial end and configured to be removably secured to a holder.

17. The fixture of claim 1, wherein each channel extends between an open end disposed at the first axial end of the hollow body to a closed end disposed proximal to the second axial end of the hollow body, and wherein the closed end of each channel is configured to engage with the corresponding adjacent component, thereby acting as an axial stop for the corresponding adjacent component.

18. An inspection system comprising:

a plurality of components;

a holder; and the fixture of claim 1, wherein each channel from the plurality of channels is configured to at least partially and slidably receive therein from the first axial end at least two of the plurality of components disposed adjacent to each other with respect to the central axis, and wherein the hollow body is removably secured to the holder at the second axial end.

19. The inspection system of claim 18, wherein each of the plurality of components is a prototype of a part of a gas turbine engine.

20. A method for removably securing a plurality of components to the fixture of claim 1, the method comprising the steps of:

slidably inserting the plurality of components into the plurality of channels from the first axial end of the hollow body, such that each channel receives at least two of the plurality of components disposed adjacent to each other with respect to the central axis; and axially moving the elongate member in the first direction to lockingly engage each of the plurality of components with the corresponding channel.

* * * * *